US011933363B2

(12) United States Patent
Isozaki et al.

(10) Patent No.: US 11,933,363 B2
(45) Date of Patent: Mar. 19, 2024

(54) BEARING BOX FOR ROTATING ROLL THAT DELIVERS HIGH-TEMPERATURE SUBSTANCE(S)

(71) Applicant: JFE STEEL CORPORATION, Tokyo (JP)

(72) Inventors: Kenji Isozaki, Tokyo (JP); Shinya Ito, Tokyo (JP); Akitaka Fujii, Okayama (JP); Noriaki Ohara, Kochi (JP)

(73) Assignee: JFE STEEL CORPORATION, Tokyo (JP)

( * ) Notice: Subject to any disclaimer, the term of this patent is extended or adjusted under 35 U.S.C. 154(b) by 202 days.

(21) Appl. No.: 17/761,775

(22) PCT Filed: Sep. 18, 2020

(86) PCT No.: PCT/JP2020/035402
§ 371 (c)(1),
(2) Date: Mar. 18, 2022

(87) PCT Pub. No.: WO2021/054426
PCT Pub. Date: Mar. 25, 2021

(65) Prior Publication Data
US 2022/0373034 A1    Nov. 24, 2022

(30) Foreign Application Priority Data
Sep. 18, 2019   (JP) ................ 2019-168952

(51) Int. Cl.
*F16C 13/02* (2006.01)
*B22D 11/128* (2006.01)
(Continued)

(52) U.S. Cl.
CPC ........ *F16C 37/007* (2013.01); *B22D 11/1287* (2013.01); *F16C 13/02* (2013.01); *F16C 35/047* (2013.01); *F16C 2322/12* (2013.01)

(58) Field of Classification Search
CPC ........ F16C 13/00; F16C 13/02; F16C 13/022; F16C 35/042; F16C 35/045; F16C 35/047;
(Continued)

(56) References Cited

U.S. PATENT DOCUMENTS

| 4,596,476 A | * | 6/1986 | Schill ............ F16C 35/042 384/471 |
| 5,186,547 A | * | 2/1993 | Muhl ............ F16C 33/80 384/480 |

(Continued)

FOREIGN PATENT DOCUMENTS

| CN | 201823915 U |   | 5/2011 |
| CN | 203868150 U | * | 10/2014 |

(Continued)

OTHER PUBLICATIONS

Aug. 2, 2022 Search Report issued in European Patent Application No. 20866469.8.

(Continued)

*Primary Examiner* — Phillip A Johnson
(74) *Attorney, Agent, or Firm* — Oliff PLC

(57) ABSTRACT

A bearing box for a rotating roll that delivers a high-temperature substance. The bearing box includes a bearing portion and a seal portion provided adjacent to the bearing portion and includes a first cooling liquid passage that is formed on the outer peripheral side of the bearing portion and through which a cooling liquid passes, and a second cooling liquid passage that is formed on the radially inner side relative to the first cooling liquid passage and on the outer peripheral side of the seal portion, the second cooling liquid passage communicating with the first cooling liquid passage to cause the cooling liquid to pass therethrough.

8 Claims, 7 Drawing Sheets

(51) Int. Cl.
*F16C 35/04* (2006.01)
*F16C 37/00* (2006.01)

(58) Field of Classification Search
CPC . F16C 37/007; F16C 2322/12; B22D 11/1287
See application file for complete search history.

(56) References Cited

U.S. PATENT DOCUMENTS

| | | | |
|---|---|---|---|
| 5,915,843 A * | 6/1999 | Mattera | F16C 37/007 |
| | | | 384/321 |
| 8,616,778 B2 * | 12/2013 | Takahashi | B22D 11/1287 |
| | | | 384/476 |
| 9,343,646 B2 * | 5/2016 | Bartl | F16C 41/004 |
| 2006/0183614 A1 | 8/2006 | Brotzki et al. | |
| 2009/0295151 A1 | 12/2009 | Springmann et al. | |
| 2012/0043047 A1 | 2/2012 | Springmann et al. | |
| 2015/0258605 A1 | 9/2015 | Poeppl et al. | |
| 2020/0269311 A1 | 8/2020 | Banse et al. | |

FOREIGN PATENT DOCUMENTS

| | | | | |
|---|---|---|---|---|
| CN | 206206423 U | 5/2017 | | |
| CN | 207154718 U | 3/2018 | | |
| DE | 42 07 042 C1 | 9/1993 | | |
| DE | 10 2005 052 067 A1 | 5/2007 | | |
| DE | 102016224761 A1 | 6/2017 | | |
| EP | 4159343 A1 * | 4/2023 | | B22D 11/1287 |
| JP | S54-82327 A | 6/1979 | | |
| JP | H08-168859 A | 7/1996 | | |
| JP | H10-274247 A | 10/1998 | | |
| JP | 2003-290891 A | 10/2003 | | |
| JP | 2004011766 A * | 1/2004 | | F16C 35/047 |
| JP | 2004-148407 A | 5/2004 | | |
| JP | 2006-035236 A | 2/2006 | | |
| JP | 2006-515804 A | 6/2006 | | |
| JP | 2010-23061 A | 2/2010 | | |
| JP | 2013-103254 A | 5/2013 | | |
| RU | 2 038 187 C1 | 6/1995 | | |
| RU | 2 633 166 C2 | 10/2017 | | |
| RU | 2 642 235 C2 | 1/2018 | | |

OTHER PUBLICATIONS

Nov. 25, 2022 Office Action issued in Russian Patent Application No. 2022107189.
Apr. 14, 2023 Office Action issued in Russian Patent Application No. 2022107189.
Apr. 28, 2023 Office Action issued in Chinese Patent Application No. 202080064192.6.
Oct. 20, 2020 International Search Report issued in International Application No. PCT/JP2020/035402.
Jun. 5, 2023 Office Action issued in Korean Patent Application No. 10-2022-7008493.

\* cited by examiner

BEARING BOX FOR ROTATING ROLL THAT DELIVERS HIGH-TEMPERATURE SUBSTANCE(S)

TECHNICAL FIELD

This application relates to a bearing box for a rotating roll that delivers high-temperature substance(s), such as a cast piece-supporting roll that delivers high-temperature cast piece(s) in a continuous casting machine.

BACKGROUND

Continuous casting is a solidification process of continuously cooling and solidifying a molten steel, whose, for example, components and temperature have been adjusted through a refining process, to form cast pieces having uniform dimensions and shape. During the continuous casting, a segment roll mounted on a segment frame serves as a guide when a cast piece whose inside is unsolidified is held and withdrawn.

As FIG. 7 illustrates, each segment roll 33 mounted on a segment frame 31 has divided rolls constituted by two to four rolls 35 arranged in the axial direction, and an end portion of each of the rolls 35 constituting the divided rolls is supported by a bearing portion provided in a bearing box 37. The segment rolls 33 have a structure in which the plural pairs of divided rolls are arranged on the upper side and the lower side.

The bearing boxes 37 for supporting the respective rolls 35 in the segment rolls 33 and, inside each of the bearing boxes 37, the bearing portion, a seal portion, and a lubricating oil or a grease for lubrication are in contact with or adjacent to a cast piece during casting and are thus exposed to a high-temperature environment. Among the bearing portions, in particular, the bearing portions of the bearing boxes 37 disposed on the central side of each segment frame 31 have problems such as rotation failure due to carbonization of lubricant, breakage of the bearing portion, and hardening of the seal portion.

To address such problems, Patent Literature 1 proposes a method of obtaining a cooling effect. In the method, plural grooves are formed in the outer periphery of a bearing box, cooling water is taken through an inflow hole at one end of each groove, and the other end of the groove is open to cause the cooling water that has flowed through the groove to flow down again from an outer surface of a lid of the bearing box. Thus, there are obtained the cooling effect of the inside of the bearing box due to the cooling water flowing through the groove and the cooling effect of the outside of the bearing box due to the evaporation heat when the cooling water flows down from the lid and is vaporized.

Moreover, Patent Literature 2 proposes a method for cooling a bearing box in a roller table for delivering a slab by blowing air from the outside.

Furthermore, Patent Literature 3 discloses that, in a roll segment device that guides a cast piece in a continuous casting machine, water is sprinkled on the roll segment based on the observation of a surface of the cast piece so as to prevent reduction in the accuracy of the thickness of the cast piece, which is caused by a roll-constituting member having heat due to the radiant heat of the cast piece.

CITATION LIST

Patent Literatures

Patent Literature 1: Japanese Unexamined Patent Application Publication No. 10-274247

Patent Literature 2: Japanese Unexamined Patent Application Publication No. 2003-290891

Patent Literature 3: Japanese Unexamined Patent Application Publication No. 2010-23061

SUMMARY

Technical Problem

However, the method disclosed in Patent Literature 1 has the features of obtaining an external cooling effect due to the evaporation heat generated by the cooling water being discharged outside the bearing box. Thus, due to such features, there is concern about excessive cooling of the cast piece caused by the water that has been discharged outside being poured on the cast piece.

The method disclosed in Patent Literature 2 has problems where the cooling performed by using air exhibits a small heat removal effect, and, in addition, the bearing box is not cooled uniformly. Regarding, in particular, a bearing disposed on the central side of the segment, it is difficult to blow cooling air uniformly against a portion of the bearing that receives the radiant heat of the cast piece.

Furthermore, although Patent Literature 3 describes that the water is sprinkled on the roll segment, the method of sprinkling water is not described fully enough to be reproducible, and there is uncertainty about whether the bearing box can effectively be cooled.

As described above, none of Patent Literatures 1 to 3 can achieve effective cooling of the bearing box.

Note that the commonest bearing box-cooling method of the related art is a method in which the bearing box is provided with a water-cooling jacket as with the disclosure of Patent Literature 1 described above, in addition to the external cooling effect of the bearing box exhibited by using cast piece-cooling water that cools a cast piece.

FIG. 8 illustrates such a common existing cooling structure of the bearing box 37 with a water-cooling jacket. In FIG. 8, 33 denotes a segment roll, 37 denotes a bearing box that supports a shaft of the segment roll 33 so that the shaft can rotate, 39 denotes a bearing portion provided in the bearing box 37, 41 denotes a seal portion, 43 denotes a retainer, 45 denotes a cooling water passage through which the cooling water for cooling mainly the bearing portion 39 passes, and 47 denotes a lid member for forming the cooling water passage 45.

In the bearing portion 39 in a continuous casting machine, the cooling of the related art has been performed by a water-cooling jacket being configured. Such a water-cooling jacket is configured by the cooling water passage 45 being formed in the bearing box 37 as described above and being covered with the lid member 47. However, regarding high-grade steel manufacturing in recent years, the casting method in which the cast piece-cooling water is reduced as much as possible in a curved zone positioned upstream of the casting to prevent a crack in a surface and a corner portion of a cast piece, has come to be conducted. Accordingly, the hitherto-obtained external cooling effect due to the cast piece-cooling water is decreased, and the thermal load applied to the bearing box 37 and the roll 35 increases.

Although the radiant heat from a cast piece 49 affects, as the arrows in FIG. 8 indicate, not only the bearing portion 39 but also the seal portion 41 provided adjacent to the bearing portion 39, the structure of the related art cannot cool the seal portion 41, and the thermal load applied to the seal portion 41 is large.

The disclosed embodiments have been made to solve such a problem, and an object of the disclosed embodiments is to provide a bearing box for a rotating roll that delivers high-temperature substance(s), the bearing box being capable of reducing a thermal load at a bearing portion and a seal portion provided adjacent to the bearing portion to effectively prevent rotation failure, breakage of the bearing portion, and hardening of the seal portion.

Solution to Problem

The solution to the above-described problem is as follows.

[1] A bearing box for a rotating roll that delivers a high-temperature substance, the bearing box including a bearing portion and a seal portion provided adjacent to the bearing portion, the bearing box including: a first cooling liquid passage that is formed on the outer peripheral side of the bearing portion and through which a cooling liquid passes; and a second cooling liquid passage that is formed on the radially inner side relative to the first cooling liquid passage and on the outer peripheral side of the seal portion, the second cooling liquid passage communicating with the first cooling liquid passage to cause the cooling liquid to pass therethrough.

[2] The bearing box for a rotating roll that delivers a high-temperature substance according to item [1], in which, in a section of the bearing box in the axial direction of the rotating roll, the total width of the first cooling liquid passage and the second cooling liquid passage is ½ or more of the width of the bearing box.

[3] The bearing box for a rotating roll that delivers a high-temperature substance according to item [1] or [2], the bearing box including, a first jacket component that forms the first cooling liquid passage and a second jacket component that forms the second cooling liquid passage and has an annular shape.

[4] The bearing box for a rotating roll that delivers a high-temperature substance according to item [3], in which, at the boundary between the first cooling liquid passage and the second cooling liquid passage, a plurality of fixing components for fixing the first jacket component and the second jacket component are provided at a predetermined interval.

[5] The bearing box for a rotating roll that delivers a high-temperature substance according to item [4], in which each of the fixing components is fixed to a bottom surface of the first cooling liquid passage and has a protrusion protruding toward the side of the second cooling liquid passage, the first jacket component is fixed to a top surface of the fixing component, and the second jacket component is fixed to the protrusion of the fixing component.

Advantageous Effects

The bearing box for a rotating roll that delivers a high-temperature substance according to the disclosed embodiments includes: the first cooling liquid passage that is formed on the outer peripheral side of the bearing portion and through which a cooling liquid passes; and the second cooling liquid passage that is formed on the radially inner side relative to the first cooling liquid passage and on the outer peripheral side of the seal portion, the second cooling liquid passage communicating with the first cooling liquid passage to cause the cooling liquid to pass therethrough, and it is thereby possible to cool not only the bearing portion but also the seal portion to reduce the thermal load at the seal portion. Thus, rotation failure, breakage of the bearing portion, and hardening of the seal portion can effectively be prevented.

DETAILED DESCRIPTION

Figure 1:
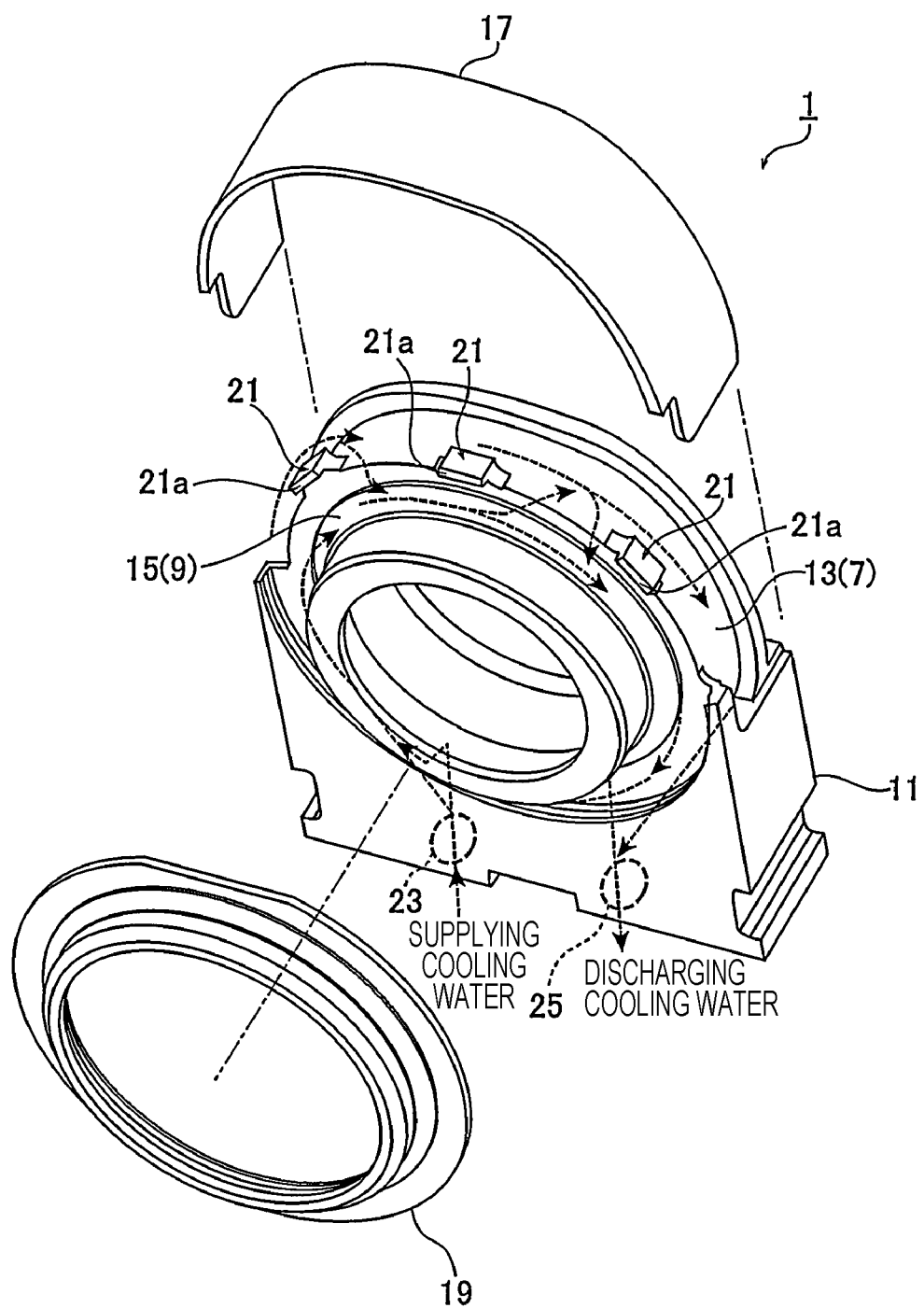
FIG. 1 is an exploded perspective view of a bearing box according to an embodiment.

Regarding a bearing box for a rotating roll that delivers a high-temperature substance according to the disclosed embodiments (hereinafter, referred to as simply "bearing box"), a bearing box 1 for a segment roll mounted on a segment frame of a continuous casting machine will be described, as an example, based on FIGS. 1 to 6. Note that a cooling liquid passage that is a distinctive portion of the disclosed embodiments is mainly illustrated in FIGS. 1 to 6, while a bearing portion 3 and a seal portion 5 are illustrated only by phantom lines, that is, chain double-dashed lines in FIG. 5 and the illustration thereof is omitted; however, the basic structures of the bearing portion 3 and the seal portion 5 are similar to those in FIG. 8.

As FIGS. 1 to 6 illustrate, the bearing box 1 according to the present embodiment includes the bearing portion 3 and the seal portion 5 provided adjacent to the bearing portion 3 (refer to FIG. 5), and the bearing box 1 includes a first cooling liquid passage 7 that is formed on the outer peripheral side of the bearing portion 3 and through which a cooling liquid passes and a second cooling liquid passage 9 that is formed on the radially inner side relative to the first cooling liquid passage 7 and on the outer peripheral side of the seal portion 5 and through which the cooling liquid passes.

The first cooling liquid passage 7 and the second cooling liquid passage 9 are formed by a first jacket component 17 and a second jacket component 19 being mounted respectively on a first cooling liquid passage bottom portion 13 and a second cooling liquid passage bottom portion 15 formed in a main body 11 of the bearing box 1, so as to cover the respective cooling liquid passage bottom portions.

As FIG. 1 illustrates, the first jacket component 17 is constituted by a plate member having a semi-circular arc shape, and the second jacket component 19 is constituted by an annular member.

Plural fixing components 21 for fixing the first jacket component 17 and the second jacket component 19 are provided, at a predetermined interval, on a portion of the first cooling liquid passage bottom portion 13 positioned on the second cooling liquid passage 9 side.

Figure 5:
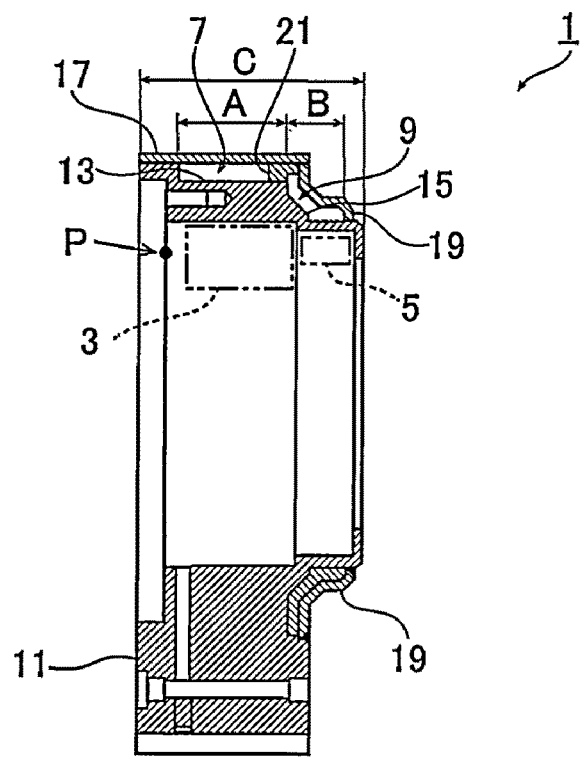
FIG. 5 is a sectional view taken along line A-A in FIG. 2.
Figure 6:
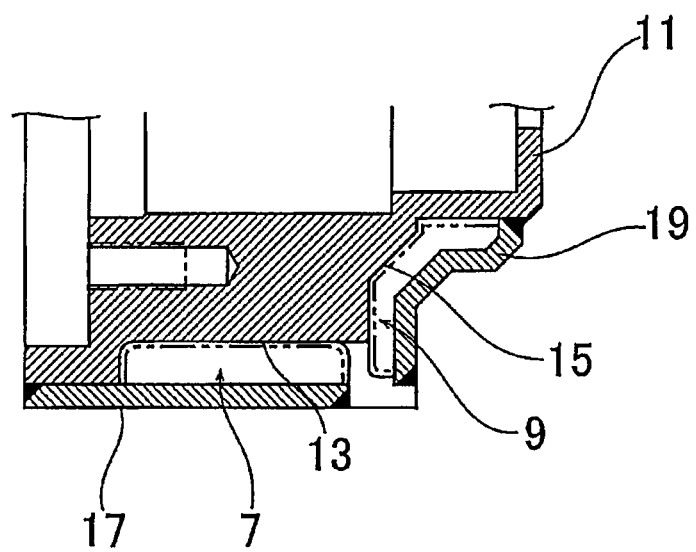
FIG. 6 is a sectional view taken along line B-B in FIG. 3.
Figure 7:
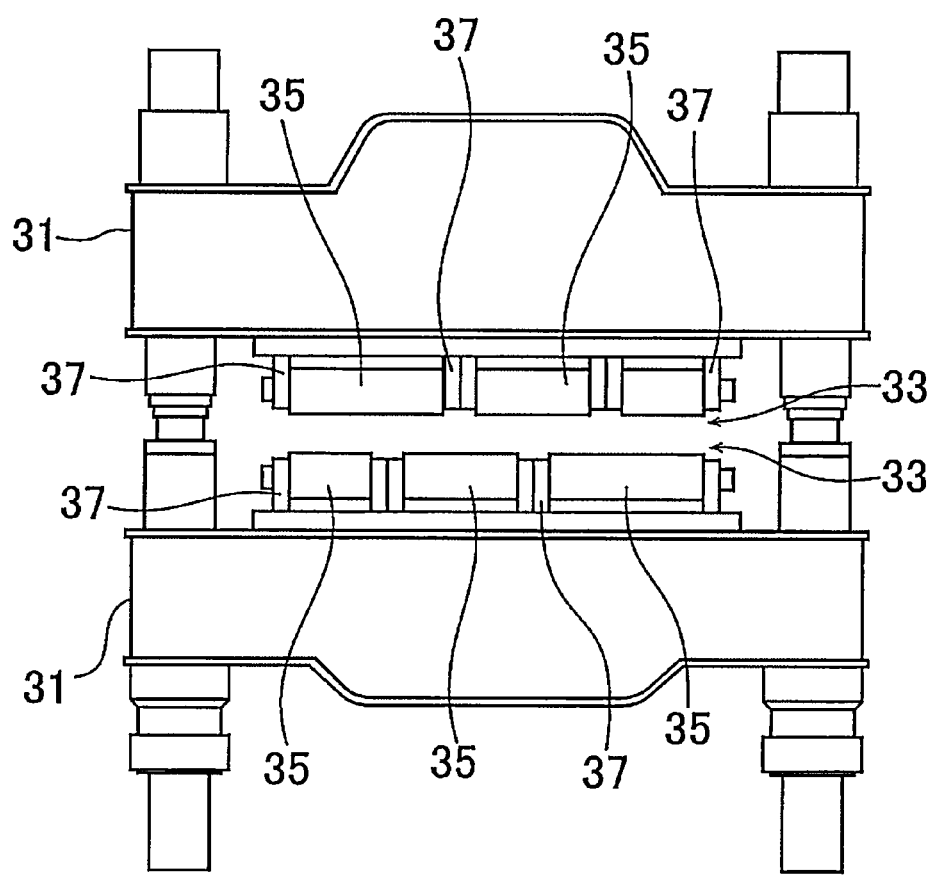
FIG. 7 illustrates a segment frame of a continuous casting machine.

As FIG. 1 and FIG. 5 illustrate, each of the fixing components 21 has a protrusion 21a protruding toward the second cooling liquid passage 9 side, the first jacket component 17 is fixed to a top surface of each fixing component 21 by welding, and the second jacket component 19 is fixed to each protrusion 21a by welding.

A water-cooling jacket structure is configured by the first jacket component 17 and the second jacket component 19 being fixed by welding to form a sealed structure.

The first cooling liquid passage 7 and the second cooling liquid passage 9, which are configured as described above, communicate with one another, and, as FIG. 1 illustrates, the cooling liquid flowing in the first cooling liquid passage 7 and the cooling liquid flowing in the second cooling liquid passage 9 can mutually flow back and forth between both the cooling liquid passages.

Thus, by the first cooling liquid passage 7 and the second cooling liquid passage 9 communicating with one another, the cooling liquid flows not only in one cooling liquid passage having small resistance (the first cooling liquid passage 7 in the present embodiment), but the cooling liquid can be caused to flow all around both the cooling liquid passages without stagnating.

A cooling liquid-supplying portion 23 and a cooling liquid-discharging portion 25 are provided in a lower portion of the main body 11 of the bearing box 1.

The cooling liquid-supplying portion 23 is constituted by a passage 27 extending upward from the lower portion and bifurcating into two passages communicating respectively with the first cooling liquid passage 7 and the second cooling liquid passage 9.

In addition, as with the cooling liquid-supplying portion 23, the cooling liquid-discharging portion 25 is also constituted by a passage 29 bifurcating into two passages, the two passages 29 communicating respectively with the first cooling liquid passage 7 and the second cooling liquid passage 9.

Figure 2:
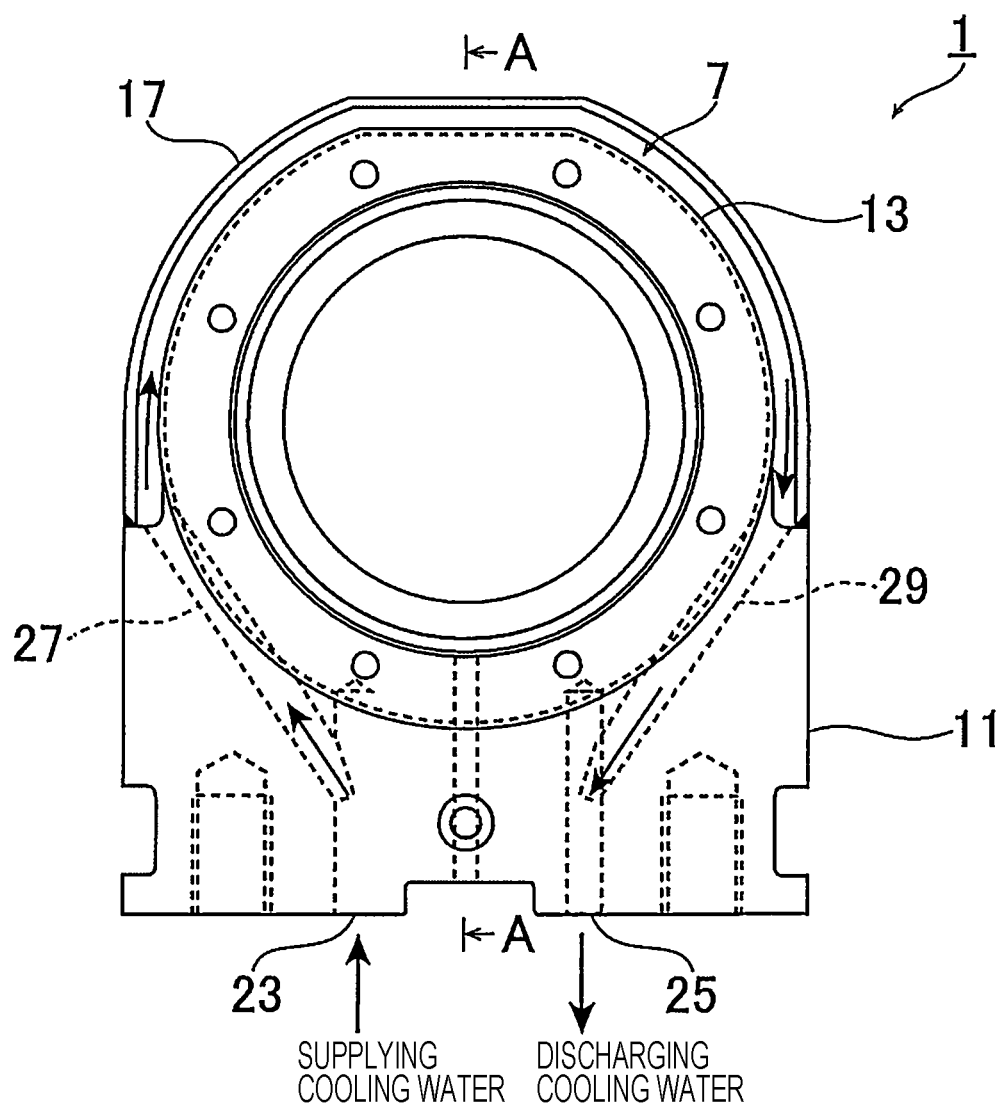
FIG. 2 is a front view of the bearing box according to an embodiment.
Figure 3:
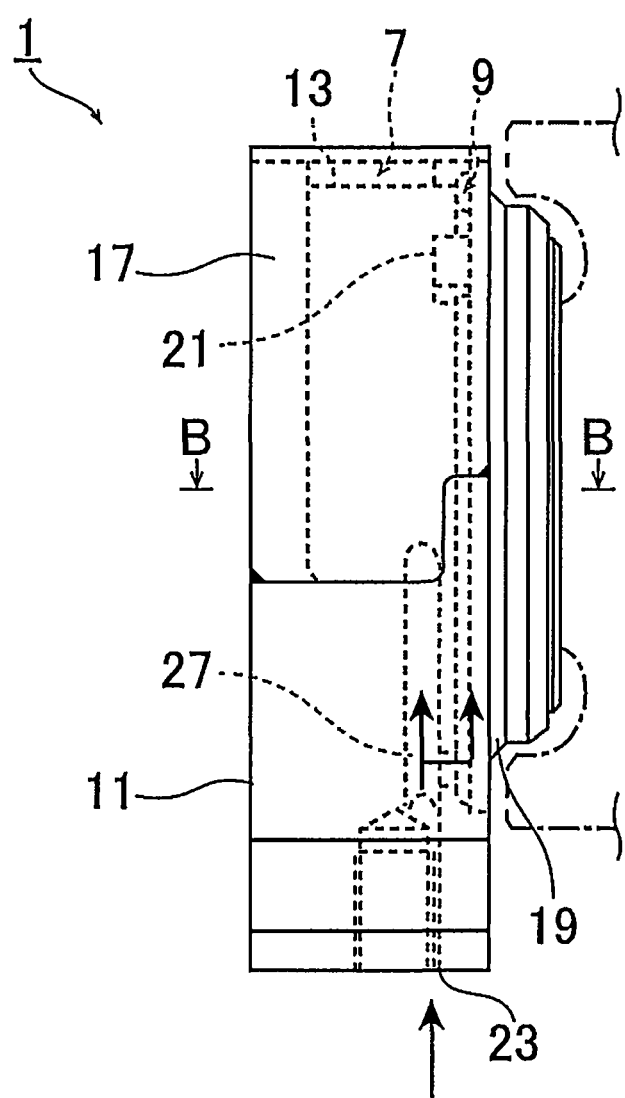
FIG. 3 is a side view of the bearing box according to an embodiment.
Figure 4:
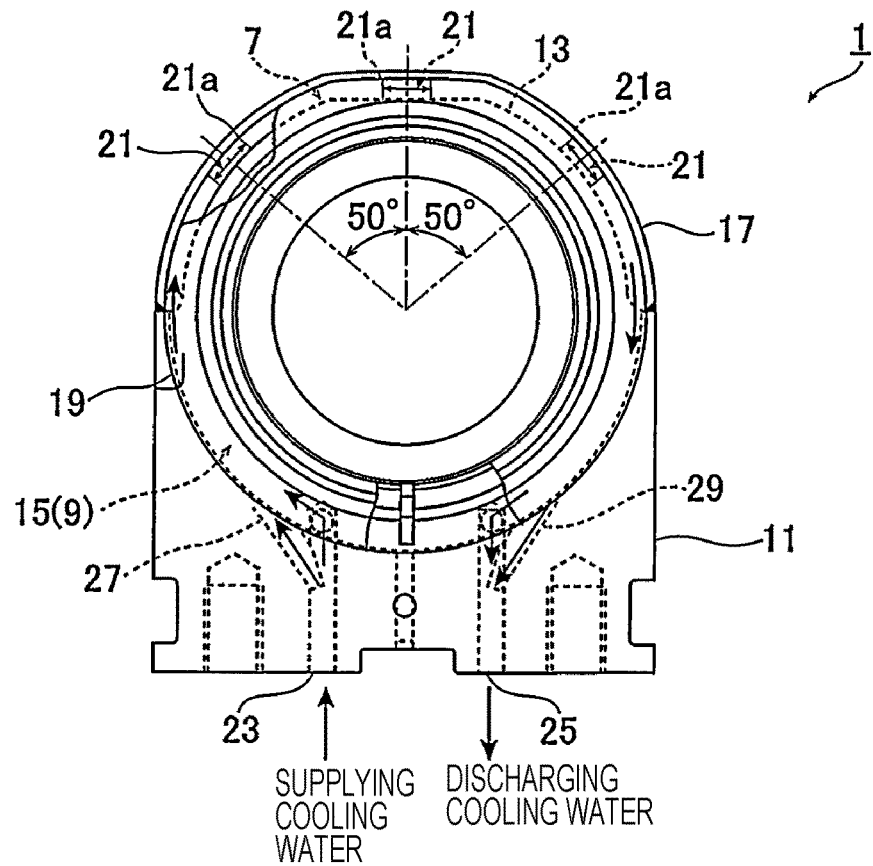
FIG. 4 is a back view of the bearing box according to an embodiment.

In a section of the bearing box 1 in the axial direction of the rotating roll, that is, the section (refer to FIG. 5) taken along line A-A in FIG. 2, the total of a width A of the first cooling liquid passage 7 and a width B of the second cooling liquid passage 9 (A+B) is set to ½ or more of a width C of the bearing box 1. The reasons for such setting are as follows.

The problem to be solved with the disclosed embodiments is how to prevent the inability of a bearing to rotate due to an oxidized lubricating oil stain caused by the temperature of the bearing portion 3 being raised by the bearing portion 3 and the seal portion 5 being heated by the radiant heat from a cast piece.

Most of the radiant heat from the cast piece is infrared radiation, and the wavelength of such infrared radiation is extremely small with respect to the members constituting the bearing portion 3 and the seal portion 5; thus, the diffraction effect on, for example, an obstacle is not exhibited. Consequently, when viewing from the position of each portion of the bearing box 1 toward a cast piece and if the cast piece turning bright red can be seen even in small part, the portion of the bearing box 1 at such a position is heated by the infrared radiation of the cast piece.

Thus, in the present embodiment, the heat resistance of the bearing portion 3 is improved by increasing the water-cooling coverage with respect to the infrared radiation emitted from a high-temperature substance, that is, setting the water-cooling coverage to ½ or more.

The bearing box 1, according to the present embodiment, configured as described above includes the first cooling liquid passage 7 and the second cooling liquid passage 9 that is formed on the radially inner side relative to the first cooling liquid passage 7 and on the outer peripheral side of the seal portion 5, the second cooling liquid passage 9 communicating with the first cooling liquid passage 7 to cause the cooling liquid to pass therethrough, and the water-cooling jacket thereby completely blocks the radiant heat from the cast piece to suppress not only an increase in the temperature of the bearing portion 3 but also an increase in the temperature of the seal portion 5. Thus, carbonization of a bearing lubricant and hardening of a seal can be prevented.

That is, the thermal flux moving toward the bearing portion 3 from the surface of the bearing box 1 at which the radiant heat generated from the cast piece arrives can mainly be reduced by the cooling liquid flowing in the first cooling liquid passage 7, and the thermal flux moving toward the bearing portion 3 and the seal portion 5 of a neck of the rotating roll from the surface of the bearing box 1 at which the radiant heat generated from the cast piece arrives can be reduced by the cooling liquid flowing in the second cooling liquid passage 9. Thus, the thermal load is effectively reduced.

Note that, although the cooling liquid-supplying portion 23 and the cooling liquid-discharging portion 25 are provided in the lower portion of the main body 11 in the example illustrated in FIGS. 1 to 6, the positions at which the cooling liquid-supplying portion 23 and the cooling liquid-discharging portion 25 are provided are not particularly limited, and the cooling liquid-supplying portion 23 and the cooling liquid-discharging portion 25 may be provided, for example, at a side of the main body 11.

In addition, although the bearing box 1 for the segment roll mounted on the segment frame of the continuous casting machine is described as an example in the above-described embodiment, the disclosed bearing box is not limited to the bearing box 1 for the segment roll and is widely applicable to bearing boxes for a rotating roll that delivers a high-temperature substance.

EXAMPLES

A test was conducted to verify the effects of the disclosed embodiments. In the test, a bearing box for a cast piece-supporting roll (guide roll) of a steel-slab continuous casting machine was used, and the bearing box was cooled by cooling water. Hereinafter, the test will be described.

The test-target bearing box is a bearing box for the cast piece-supporting roll that supports a cast piece having a surface temperature of 700 to 900° C., and a bearing (rolling-element bearing) having an outside diameter of 170 mm, an inside diameter of 110 mm, and a width of 43 mm is mounted in the bearing box.

Figure 8:
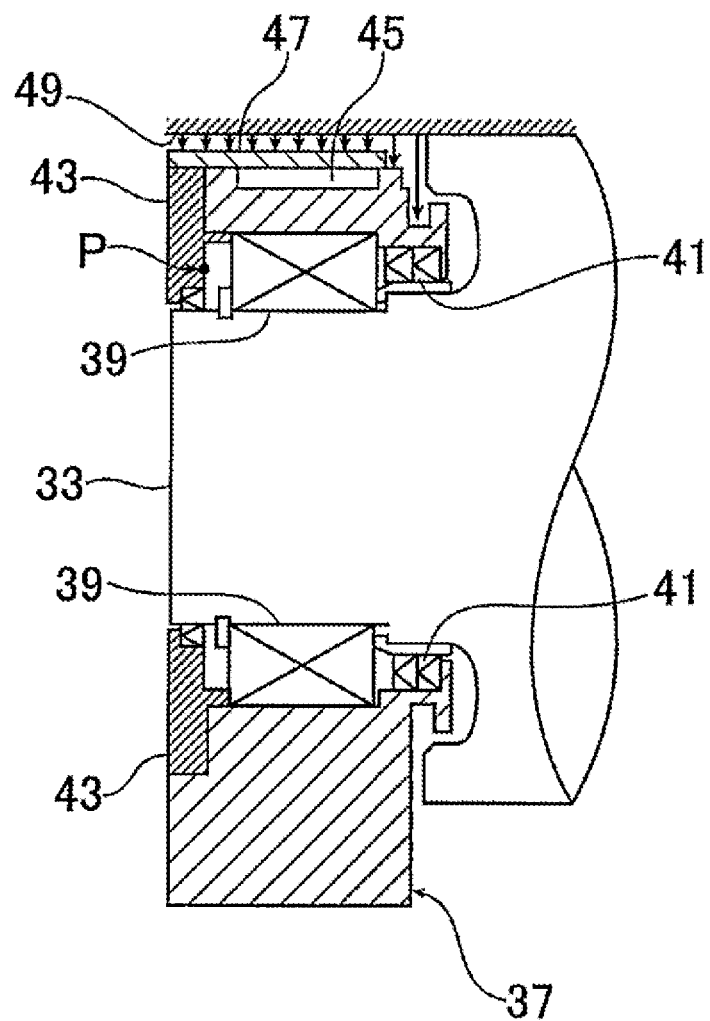
FIG. 8 illustrates a bearing box of an example of the related art provided at an end portion of a segment roll.

In the test, the bearing box 1, according to the disclosed embodiments, illustrated in FIGS. 1 to 6 and the bearing box 37 illustrated in FIG. 8 for comparison were installed, and the temperatures of the bearing box 1 and the bearing box 37 during continuous casting were measured and compared with one another.

With respect to the bearing box 1, according to the disclosed embodiments, illustrated in FIGS. 1 to 6 (hereinafter, also referred to as "Example") and the bearing box 37 illustrated in FIG. 8 for comparison (hereinafter, also referred as "Comparative Example"), cooling water was taken into each bearing box at 15L per minute, and the bearing box 1 and the bearing box 37 were cooled. Regarding both the bearing box 1 according to the Example and the bearing box 37 as the Comparative Example, the cooling water after cooling the bearing box 1 and the bearing box 37 was then caused to run down along the outer peripheries of the respective bearing boxes 1 and 37.

The position of an end portion of each of the bearing portions 3 and 39 provided adjacent to the respective seal portions 5 and 41 is denoted by reference "P" in FIG. 5 and FIG. 8, and the temperature at each position P during a continuous casting operation over a one-day period was measured by using a sheathed thermocouple. As a result, in the Example, during the continuous casting, the temperature of the seal portion 5 was lower than the temperature of the seal portion 41 of the example of the related art by 20 to 40° C., and it was thus verified that the influence of the radiant heat from the cast piece on the seal portion 5 was able to be reduced.

In the Comparative Example, the seal portion 41 is not covered with the lid member 47, whereas, in the Example, the seal portion 5 is also covered with the second jacket component 19. Thus, as a result of obtaining the temperatures of these portions by performing temperature analysis, it was verified that the temperature of the seal portion 5 of the Example is also decreased compared with the temperature of the seal portion of the Comparative Example.

The invention claimed is:

1. A bearing box for a rotating roll that delivers a high-temperature substance, the bearing box comprising:
    a bearing portion;
    a seal portion provided adjacent to the bearing portion;
    a first cooling liquid passage disposed on an outer peripheral side of the bearing portion and through which a cooling liquid passes; and
    a second cooling liquid passage disposed on a radially inner side relative to the first cooling liquid passage and on an outer peripheral side of the seal portion, the second cooling liquid passage communicating with the first cooling liquid passage to cause the cooling liquid to pass therethrough.

2. The bearing box for a rotating roll that delivers a high-temperature substance according to claim 1, wherein, in a section of the bearing box in an axial direction of the rotating roll, a total width of the first cooling liquid passage and the second cooling liquid passage is ½ or more of a width of the bearing box.

3. The bearing box for a rotating roll that delivers a high-temperature substance according to claim 2, the bearing box further comprising:
    a first jacket component that forms the first cooling liquid passage; and
    a second jacket component that forms the second cooling liquid passage and has an annular shape.

4. The bearing box for a rotating roll that delivers a high-temperature substance according to claim 3, wherein, at a boundary between the first cooling liquid passage and the second cooling liquid passage, a plurality of fixing components configured to fix the first jacket component and the second jacket component are provided at a predetermined interval.

5. The bearing box for a rotating roll that delivers a high-temperature substance according to claim 4, wherein each of the fixing components is fixed to a bottom surface of the first cooling liquid passage and has a protrusion protruding toward a side of the second cooling liquid passage, the first jacket component is fixed to a top surface of the fixing component, and the second jacket component is fixed to the protrusion of the fixing component.

6. The bearing box for a rotating roll that delivers a high-temperature substance according to claim 1, the bearing box further comprising:
    a first jacket component that forms the first cooling liquid passage; and
    a second jacket component that forms the second cooling liquid passage and has an annular shape.

7. The bearing box for a rotating roll that delivers a high-temperature substance according to claim 6, wherein, at a boundary between the first cooling liquid passage and the second cooling liquid passage, a plurality of fixing components configured to fix the first jacket component and the second jacket component are provided at a predetermined interval.

8. The bearing box for a rotating roll that delivers a high-temperature substance according to claim 7, wherein each of the fixing components is fixed to a bottom surface of the first cooling liquid passage and has a protrusion protruding toward a side of the second cooling liquid passage, the first jacket component is fixed to a top surface of the fixing component, and the second jacket component is fixed to the protrusion of the fixing component.

* * * * *